United States Patent
Herfurth et al.

(10) Patent No.: US 9,537,386 B2
(45) Date of Patent: Jan. 3, 2017

(54) DRIVER CONTROLLER WITH INTERNALLY CALCULATED AVERAGE OUTPUT CURRENT

(71) Applicant: Infineon Technologies Austria AG, Villach (AT)

(72) Inventors: Michael Herfurth, Gilching (DE); Xiaowu Gong, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 115 days.

(21) Appl. No.: 14/553,841

(22) Filed: Nov. 25, 2014

(65) Prior Publication Data

US 2016/0149511 A1    May 26, 2016

(51) Int. Cl.
H02M 7/217 (2006.01)
H02M 1/42 (2007.01)
H02M 1/00 (2006.01)

(52) U.S. Cl.
CPC ... H02M 1/4208 (2013.01); *H02M 2001/0003* (2013.01); *H02M 2001/4291* (2013.01)

(58) Field of Classification Search
CPC ............... H02M 7/217; H02M 1/4208; H02M 2001/4291
See application file for complete search history.

(56) References Cited

U.S. PATENT DOCUMENTS

| | | | | |
|---|---|---|---|---|
| 2006/0017424 A1* | 1/2006 | Wood | ..................... | H02M 3/156 323/274 |
| 2007/0053215 A1* | 3/2007 | Wang | ..................... | H02M 7/062 363/53 |
| 2010/0039836 A1* | 2/2010 | Gong | ..................... | H02M 3/156 363/21.13 |
| 2014/0009977 A1* | 1/2014 | Huang | ............... | H02M 3/33507 363/21.16 |

OTHER PUBLICATIONS

"BP2329A, Non-isolated Buck APFC Offline LED Controller," Bright Power Semiconductor Co., retrieved from http://www.bpsemi.com/pdf/BP2329A/BP2329A_EN_DS_Rev_1.1.pdf on Nov. 25, 2014, 8 pp.

"LYT0002/0004-0006, LYTSwitch-0 Off-Line Low Power, LED Driver IC Family, Lowest Component Count, Off-Line Switcher IC for Non-Isolated LED Lighting Applications," Power Integrations Datasheet Rev. A, Jun. 2013, 19 pp.

* cited by examiner

*Primary Examiner* — Jue Zhang
(74) *Attorney, Agent, or Firm* — Shumaker & Sieffert, P.A.

(57) ABSTRACT

Methods, devices, and integrated circuits are disclosed for a driver controller that internally calculates average output current. In one example, a method includes receiving an output voltage of an output line. The method further includes performing a calculation of an average output current at the output line based at least in part on the output voltage. The method further includes controlling an interval timing of a (Continued)

switch based at least in part on the calculation of the average output current at the output line, wherein the switch is configured for switching current to the output line.

15 Claims, 6 Drawing Sheets

US 9,537,386 B2

DRIVER CONTROLLER WITH INTERNALLY CALCULATED AVERAGE OUTPUT CURRENT

TECHNICAL FIELD

The invention relates to electronic circuits, and in particular, to current drivers.

BACKGROUND

Some driver circuit applications are directed to providing a driving current, such as for groups of light-emitting diodes (LEDs). The number of LEDs may vary depending on the specific application. A driver may control the current flowing through the LED chain, while the output voltage may be set by the number and the forward voltage of the LEDs that compose the chain. In many applications, it is desirable for the driver to deliver a constant average current (as opposed to, e.g., a constant voltage) through the load when the load is switched on. Many driver circuits typically use an external capacitor to measure the output current, to help ensure that the output current is maintained at a specified value.

SUMMARY

In general, various examples of this disclosure are directed to a driver with averaged and regulated output current. Some traditional drivers measure an output current with an external current measuring capacitor, where accuracy of output current measurement depends on the size of the capacitor. This invokes a tradeoff between effective measurement and external capacitor size, where the more effective the measurement, the bulkier and more expensive an external capacitor is required. In various examples of this disclosure, a driver delivers accurate averaged and regulated output current without an external current measuring capacitor. Instead of a tradeoff between current accuracy and external capacitor size as is typical in traditional drivers, a driver of this disclosure may deliver accurate output current while avoiding the size and expense of an external current measuring capacitor altogether.

Some examples are directed to a method of controlling a current driver. An example method includes receiving an output voltage of an output line. The method further includes performing a calculation of an average output current at the output line based at least in part on the output voltage. The method further includes controlling an interval timing of a switch based at least in part on the calculation of the average output current at the output line, wherein the switch is configured for switching current to the output line.

Some other examples are directed to a driver controller device. An example device includes a current sense circuitry group configured to receive an output voltage of an output line. The device further includes a divider circuit configured to perform a calculation of an average output current at the output line based at least in part on the output voltage. The device further includes a turn-on time generator circuit configured to control an interval timing of a switch based at least in part on the calculation of the average output current at the output line, wherein the switch is configured for switching current to the output line.

Some other examples are directed to an integrated circuit for driving a load. An example integrated circuit includes a current sense circuitry group configured to receive an output voltage of an output line. The integrated circuit further includes a divider circuit configured to perform a calculation of an average output current at the output line based at least in part on the output voltage. The integrated circuit further includes a turn-on time generator circuit configured to control an interval timing of a switch based at least in part on the calculation of the average output current at the output line, wherein the switch is configured for switching current to the output line.

The details of one or more examples of the invention are set forth in the accompanying drawings and the description below. Other features, objects, and advantages of the invention will be apparent from the description and drawings, and from the claims.

DETAILED DESCRIPTION

Figure 1:
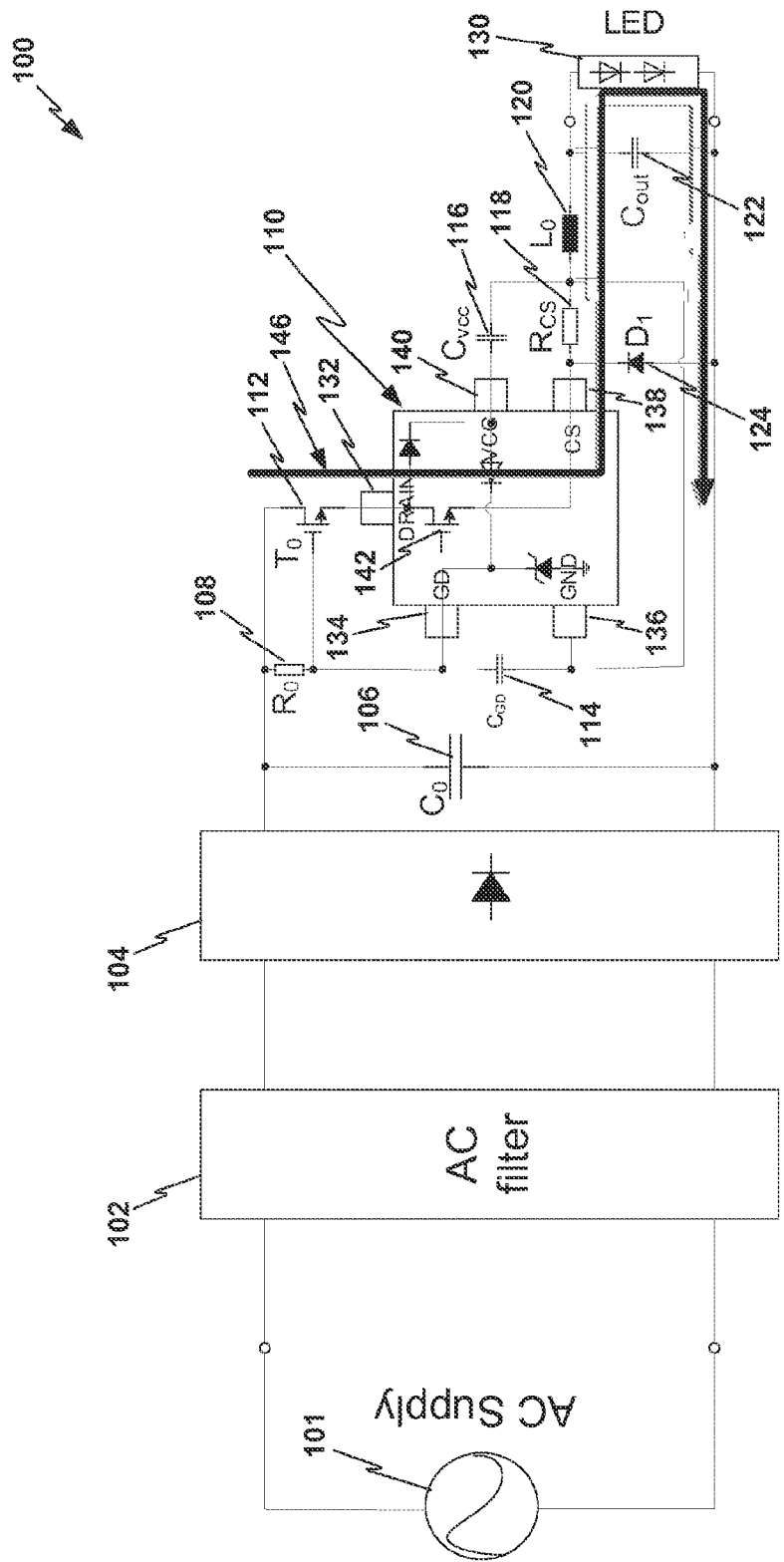
FIG. 1 is a block diagram illustrating a driver with a driver controller configured to internally calculate the average output current, in accordance with an example of this disclosure.

FIG. 1 is a block diagram illustrating a driver 100 with a driver controller 110 configured to internally calculate the average output current. Driver controller 110 does not require measuring the average output current with an external capacitor, and thus avoids the tradeoffs inherent to an external current measuring capacitor typical of traditional drivers. A driver of this disclosure may thus avoid the expense as well as the turn-on delay time inherent to a large external measuring capacitor, and instead provide a fast time-to-light time or time-to-load time for delivering current to a load, such as an array of LEDs. A driver of this disclosure may also retain information from its measured average output current measurements over alternating current (AC) half-cycles, further supporting its capability of maintaining the correct output current over time. Typical drivers used to regulate output current use a variety of architectures that share in common the need to use a large external capacitor for measuring average output current and regulating it to be constant. Driver 100 of the example of FIG. 1 internally performs a calculation of the average output current, instead of measuring the average output current with an external capacitor, and thus without the tradeoffs inherent to an external current measuring capacitor typical of traditional drivers. Aspects of a driver configured to calculate the average output current are further described with reference to various examples below.

FIG. 1 is a block diagram illustrating an example current driver 100 configured to internally perform a calculation of the average output current. Current driver 100 includes driver controller 110. Driver 100 also includes AC filter 102, rectifier 104, input smoothing capacitor $C_0$ 106, external resistor $R_0$ 108, external high side metal-oxide-semiconductor field-effect transistor (MOSFET) transistor power switch $T_0$ 112, ground-drain capacitor $C_{GD}$ 114, supply voltage capacitor $C_{VCC}$ 116, current sense resistor Rcs 118, current buffer inductor $L_0$ 120, output smoothing capacitor $C_{out}$ 122, and output filtering diode $D_1$ 124. Driver 100 is connected to an AC voltage supply 101, and has a load 130, an array of LEDs in this example, attached to its output as a load enabled to receive its output current.

As shown in the example of FIG. 1, driver controller 110 has a drain pin 132 connected to external high side power switch $T_0$ 112, a ground-drain (GD) pin 134, a ground pin 136, an output (CS) pin 138, a supply voltage $V_{CC}$ pin 140, and an internal low side MOSFET transistor power switch $T_0$ 142 connected between drain pin 132 and output pin 138. When driver 100 is turned on, via external high side power switch $T_0$ 112, current flows along path 146 through external high side power switch $T_0$ 112, driver controller 110, current sense resistor Rcs 118, and current buffer inductor $L_0$ 120 to load 130 during the turn-on period of internal low side power switch $T_0$ 142. Current flows along path 146 through driver controller 110 in particular through drain pin 136, internal low side power switch $T_0$ 142, and output pin 138. Internal low side power switch $T_0$ 142 switches on and off in a timed alternating pattern to maintain the output current. During the turn-off intervals of internal low side power switch $T_0$ 142, current continues to discharge from current buffer inductor $L_0$ 120 to load 130. Internal low side power switch $T_0$ 142 of driver controller 110 may alternate between turn-on and turn-off intervals with a high frequency, such as 60 kilohertz, or any other value that meets design specifications for a given implementation.

Driver controller 110 may control the timing between the turn-on and turn-off intervals based on its internally calculated average output current to deliver the output current at the specified value rapidly and with high accuracy. Driver controller 110 may measure the voltage received via output pin 138 and current sense resistor Rcs 118 as an input to a process of internally calculating the average output current, as further explained below. This voltage received via output pin 138 and current sense resistor Rcs 118 may be referred to as the current sense voltage. Driver controller 110 may measure the current sense voltage during both the turn-on intervals and turn-off intervals of internal low side power switch $T_0$ 142. Example waveforms of the current sense voltage are also described further below.

Figure 2:
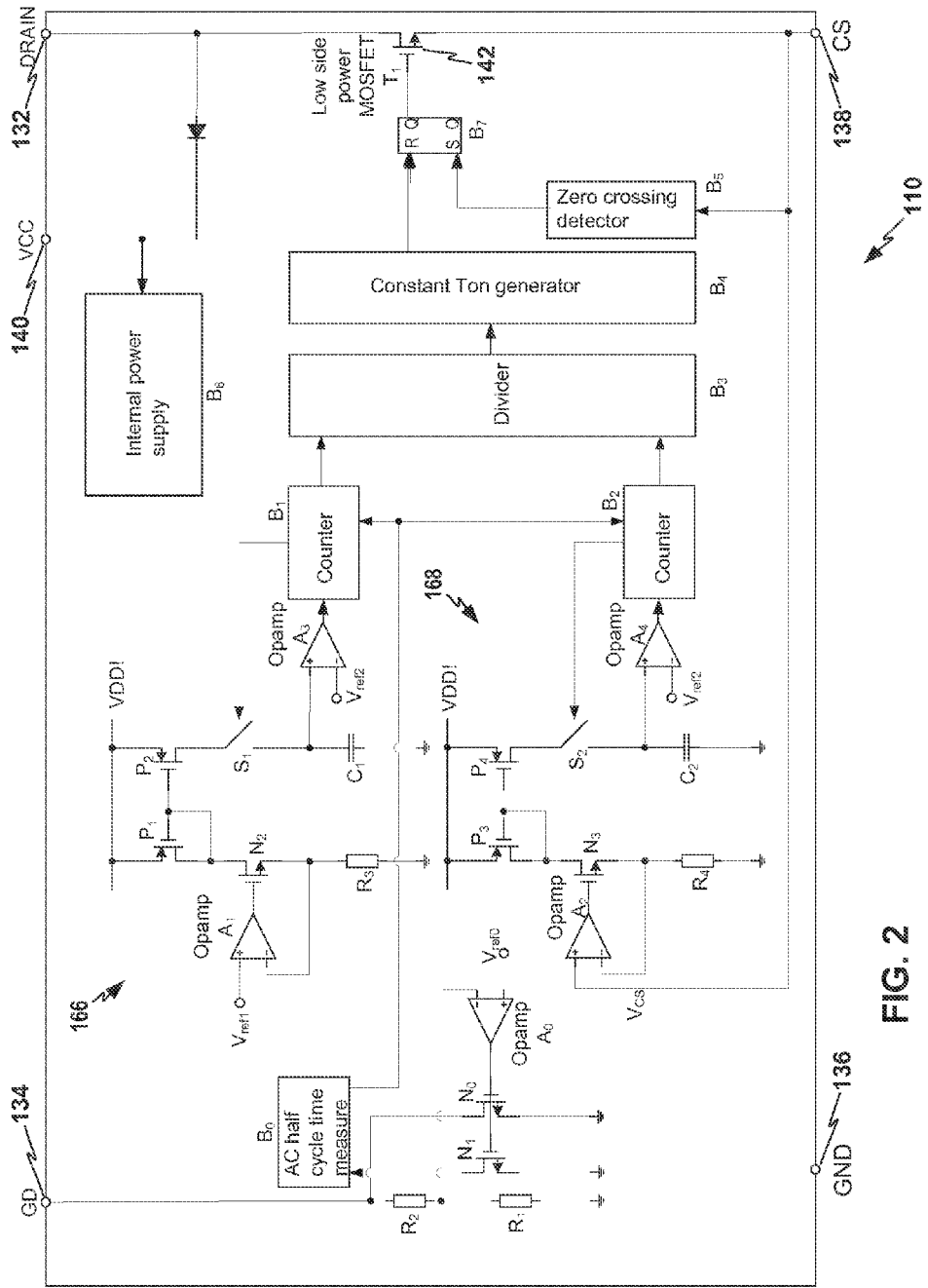
FIG. 2 is a block diagram illustrating an example driver controller as in the example driver of FIG. 1 configured to internally perform a calculation of the average output current, in accordance with an example of this disclosure.

FIG. 2 shows a block diagram illustrating an example driver controller 110 as in example driver 100 of FIG. 1 configured to internally perform a calculation of the average output current. Driver controller 110 may enable driver 100 to rapidly deliver an output current at an accurately and evenly maintained target value, and without the bulk and expense of a large external current measuring capacitor, among other advantages. Driver controller 110 includes GD pin 134, ground pin 136, output pin 138, supply voltage $V_{CC}$ pin 140, and internal power switch $T_0$ 142 connected between drain pin 132 and output pin 138, as also shown in FIG. 1. Driver controller 110 also includes various other internal components, including components that receive current sense voltage via output pin 138, perform internal calculations of the average output current based in part on the current sense voltage, and control the timing of the turn-on and turn-off intervals of internal power switch 142, thereby delivering the output current at the target value.

Driver controller 110 may therefore receive the output voltage Vcs of the output line through output pin 138, and direct the output voltage Vcs to current sense circuitry group 168. Driver controller 110 may then perform a calculation of the average output current at the output line through output pin 138 based at least in part on the output voltage Vcs. Driver controller 110 may then control the interval timing of internal low side power switch $T_1$ 142 based at least in part on the calculation of the average output current at the output line through output pin 138, wherein internal low side power switch $T_1$ 142 is configured for switching current to the output line through output pin 138. In this way, driver controller 110 may internally perform a calculation of the average output current, and achieve and maintain the output current at a target output current value.

GD pin 134 is connected to the system input voltage through external resistor $R_0$ 108, as shown in FIG. 1. GD pin 134 is connected to ground through two resistors $R_1$ and $R_2$, between which is a node connected to the inverting input of an operational amplifier (op-amp) $A_0$, which has a reference voltage $V_{ref0}$ connected to its non-inverting input. The output of op-amp $A_0$ is connected to the gate of an n-type metal-oxide-semiconductor (NMOS) transistor $N_0$, and the source and drain of NMOS transistor $N_0$ are connected between GD pin 134 and ground. A back gate of NMOS transistor $N_0$ is connected to the gate of an NMOS transistor $N_1$, which has its source and drain connected between ground and an AC half-cycle time measuring digital circuit $B_0$.

Op-amp $A_0$, reference voltage $V_{ref0}$, and NMOS transistor $N_0$ may clamp the voltage $V_{GD}$ through GD pin 134, which connects to the gate of external high side power switch $T_0$ 112, at a stable value. This stable voltage $V_{GD}$ may maintain sufficient voltage for external high side power switch $T_0$ 112 when internal low side power switch $T_1$ 142 is turned on. At the same time, NMOS transistor $N_1$ may extract current through resistor $R_2$ and enable AC half-cycle time measuring digital circuit $B_0$ to measure the duration of the AC half-cycle time.

The output of AC half-cycle time measuring digital circuit $B_0$ is connected to two digital counters $B_1$ and $B_2$. Time measuring digital circuit $B_0$ 164 may communicate the durations or the interval demarcations of AC half-cycles to digital counters $B_1$ and $B_2$ as described below. Digital counters $B_1$ and $B_2$ may also receive outputs from a reference current circuitry group 166 and a current sense circuitry group 168, respectively, and may generate outputs to additional circuitry, as described further below.

Reference current circuitry group 166 includes operational amplifier $A_1$, resistor $R_3$, reference voltage $V_{ref1}$, and NMOS transistor $N_2$. (Reference voltage $V_{ref1}$ may be the same as or different than reference voltage $V_{ref1}$, in different examples.) Reference current circuitry group 166 is configured to generate a current signal from transistor $N_2$ based on reference voltage signal $V_{ref1}$ and pass the current signal through a current mirror $P_1/P_2$, which includes two p-type metal-oxide-semiconductor (EMS) transistors $P_1$ and $P_2$, to charge a small internal capacitor $C_1$ within one AC half-cycle period. In some examples, AC half-cycle may be around 10 milliseconds (ms), internal capacitor $C_1$ may have a capacitance of only around 10 picofarads (pF), and reference voltage $V_{ref1}$ may be around 2 volts (V), so simply applying a charge without interruption to the small internal capacitor $C_1$ would completely charge internal capacitor $C_1$ to its complete capacitance in a fraction of the AC half-cycle period. However, current mirror $P_1/P_2$ applies the charge to internal capacitor $C_1$ and to the non-inverting input of an op-amp A3, through a switch S1. The inverting input of op-amp A3 is connected to a reference voltage $V_{ref2}$. (Reference voltage $V_{ref2}$ may be the same as or different than reference voltages $V_{ref0}$ or $V_{ref1}$, in different examples.) The outputs of op-amp $A_3$ and of AC half-cycle time measuring digital circuit $B_0$ 164 are connected to digital counter $B_1$, the output of which controls switch $S_1$, such that internal capacitor $C_1$ may be charged repeatedly within one AC half cycle, with the number of charges counted by digital counter $B_1$. Reference current circuitry group 166 may thus measure the charging period to charge internal capacitor $C_1$ from 0 V to $V_{ref2}$.

Current sense circuitry group 168 is analogous in some ways to reference current circuitry group 166, and includes an op-amp $A_2$, a resistor $R_4$, an NMOS transistor $N_3$, a current mirror $P_3/P_4$, a switch $S_2$, an internal capacitor $C_2$, an op-amp $A_4$ connected to reference voltage $V_{ref2}$, and a digital counter $B_2$, with the non-inverting input to op-amp $A_2$ connected to the current sense voltage $V_{CS}$. Current sense circuitry group 168 is thus enabled to generate a current signal based on current sense voltage Vcs, run the current signal through current mirror $P_3/P_4$ to charge internal capacitor $C_2$ repeatedly within one AC half-cycle period, with the number of charges counted by digital counter $B_2$. Current sense circuitry group 168 may thus measure the charging period to charge internal capacitor $C_2$ from 0 V to $V_{ref2}$.

Besides counters $B_1$ and $B_2$ outputting to control switches $S_1$ and $S_2$, respectively, counters $B_1$ and $B_2$ may also output to digital divider circuit $B_3$. After one AC half-cycle, divider circuit $B_3$ is triggered, and may divide the digital number from counter $B_1$ by the digital number from counter $B_2$. Divider circuit $B_3$ may compare the result of the this division with a fixed number, which may be based on the reference voltage and resistances of applicable resistors, as further explained below. Controller 110 may thus measure the average output current with reference to a target value for the output current.

Divider circuit $B_3$ may then output its measurement of the average output current relative to the target output current to control $T_{on}$ generator circuit $B_4$ (which may also be referred to as a turn-on time generator circuit), which controls the switching of internal low side power switch $T_0$ 142. Thus, the outputs from divider circuit $B_3$ may set the next AC half cycle $T_{on}$ time and control the average output current to reduce or eliminate any difference of the average output current from the target value or to maintain the average output current at the target value. The operation of controller 110 is further described below with reference to the waveforms of FIGS. 3-7.

Figure 3:
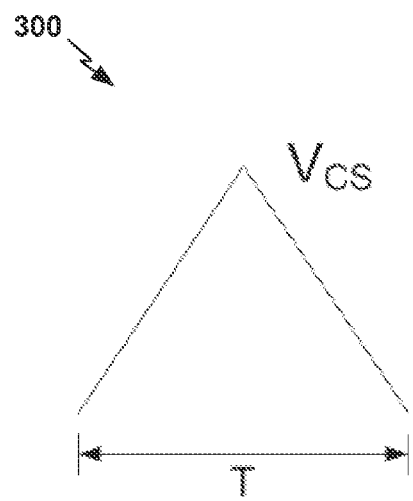
FIG. 3 shows an example output waveform of a single switched current pulse of output current that a controller may deliver via an output pin and measure via a current sense voltage to a current sense circuitry group of the controller, in accordance with an example of this disclosure.

FIG. 3 shows an example output waveform 300 of a single switched current pulse of output current that controller 110 may deliver via output pin 138 and measure via current sense voltage Vcs to current sense circuitry group 168. Controller 110 may calculate the average output current $I_{output}$ of output waveform 300 as the integral of the output voltage Vcs over the resistance of the current sense resistor Rcs over time, integrated over the pulse time T and divided by pulse time T, in accordance with Equation 1:

$$I_{output} = \frac{\int_0^T V_{CS}/R_{CS} dt}{T} \quad \text{(Eq. 1)}$$

Figure 4:
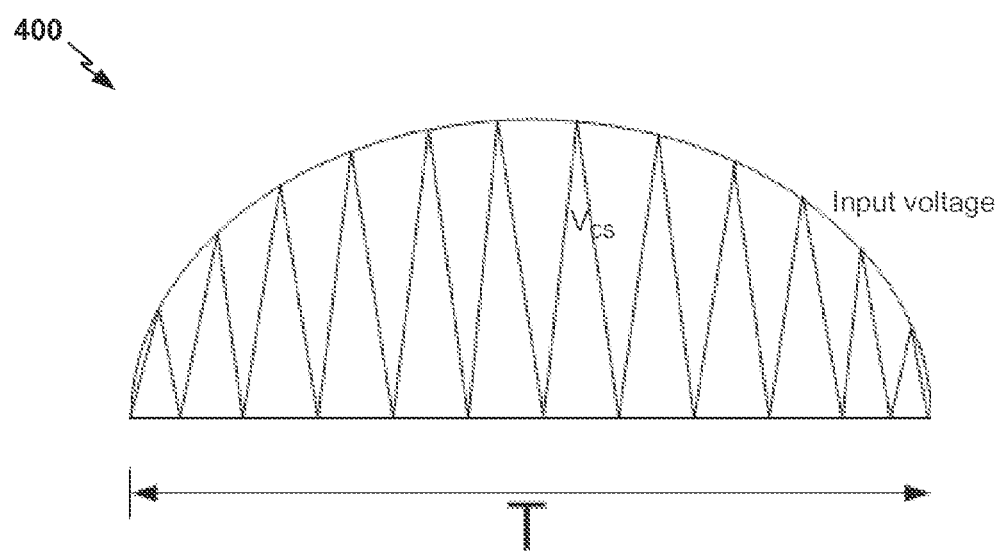
FIG. 4 shows an example output half-sine waveform of several pulses of output voltage over the course of a single AC half-cycle enclosing several switched current pulses, in accordance with an example of this disclosure.

Controller 110 may deliver several switching pulses per AC half-cycle via output pin 138, such that the several pulses are enclosed in one half-sine waveform that corresponds to the AC half-cycle. FIG. 4 shows an example output half-sine waveform 400 of several pulses of output voltage Vcs over the course of a single AC half-cycle enclosing several switched current pulses. Controller 110 may still calculate the average output current of output waveform 400 in accordance with Equation 1, with the time for the entire AC half-cycle used for time T as the interval of the definite integral and in the denominator of Equation 1.

Figure 5:
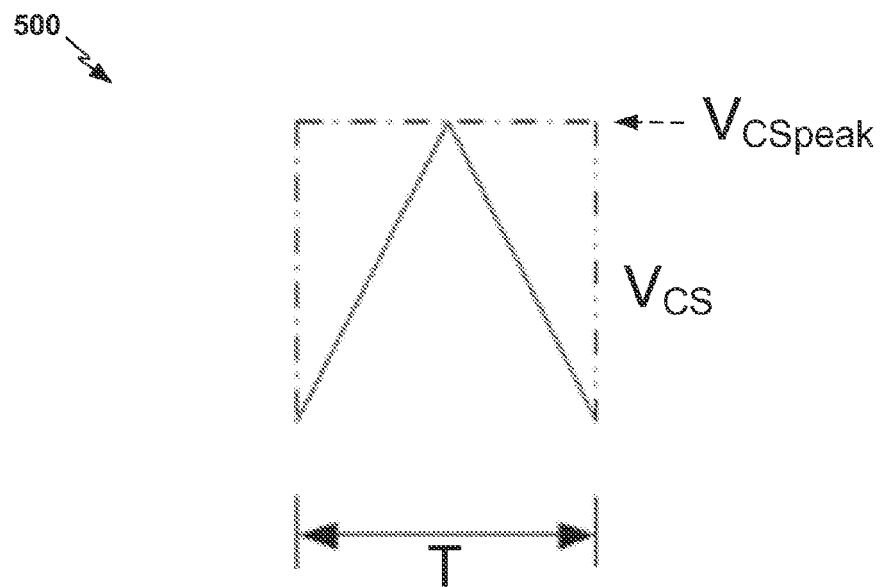
FIG. 5 shows an example output waveform of a single switched current pulse of output voltage that a controller may deliver via an output pin and measure the peak values of via a current sense circuitry group, in accordance with an example of this disclosure.

In sonic other examples, current sense circuitry group 168 may also incorporate a peak detector circuit configured to sample and hold the peak voltage of each pulse of output voltage Vcs. Such a peak detector circuit may be advantageous in some implementations in which the output voltage Vcs switches rapidly relative to the detection tolerances of current sense circuitry group 168 such that the peak detector circuit may facilitate more accurate measurement of output voltage Vcs. FIG. 5 shows an example output waveform 500 of a single switched current pulse of output voltage Vcs that controller 110 may deliver via output pin 138, and measure the peak values of using a peak detector. In implementations using a peak detector, the calculations performed by controller 110 to determine the average output current may be adjusted to apply the peak voltage and introduce a factor of 2 in the denominator, as in Equation 2:

$$I_{output} = \frac{\int_0^T V_{CSpeak}/R_{CS} dt}{2 \times T} \quad \text{(Eq. 2)}$$

Figure 6:
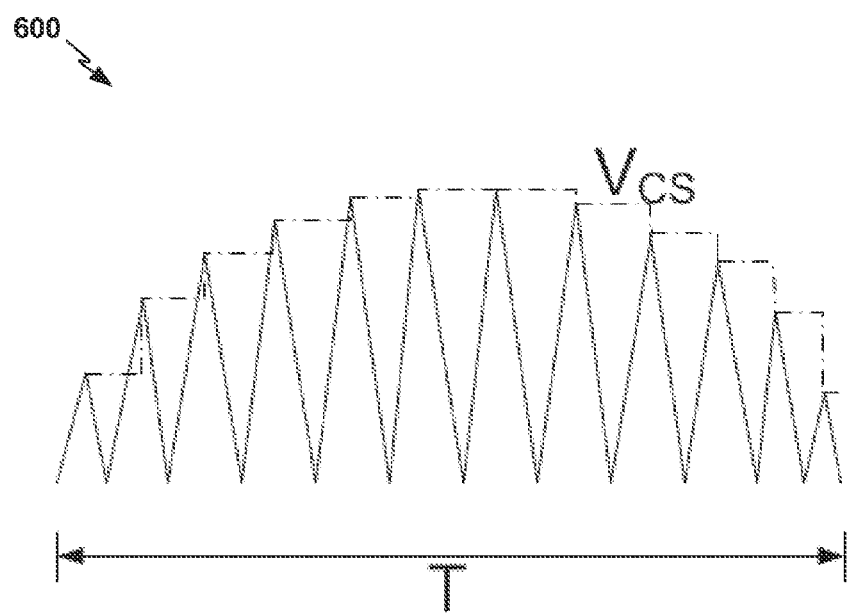
FIG. 6 shows an example output half-sine waveform of a single AC half-cycle enclosing several switched current pulses with peak current detection, in accordance with an example of this disclosure.

As in the example of continuous measurement as in FIGS. 3 and 4 rather than peak measurement as in FIG. 5, controller 110 may deliver several switching pulses per AC half-cycle via output pin 138, such that the several pulses are enclosed in one half-sine waveform corresponding to the AC half-cycle. FIG. 6 shows an example output half-sine waveform 400 of a single AC half-cycle enclosing several switched current pulses with peak current detection. Controller 110 may still calculate the average output current of output waveform 400 in accordance with Equation 2, with the time for the entire AC half-cycle used for time T as the interval of the definite integral and in the denominator.

Controller 110 may implement performing a calculation of average output current in terms of reference voltage $V_1$, resistances of resistors $R_3$ and $R_4$, and capacitances of capacitors $C_1$ and $C_2$ as shown in FIG. 2 in accordance with the following equations in some examples, in addition to output voltage Vcs and current sense resistor Rcs as in Equations 1 and 2, in accordance with Equation 3:

$$I_{output} = \frac{\frac{\int_0^T V_{CS}/R_4 dt}{C_2}}{\frac{\int_0^T \frac{V_{ref}}{R_3} dt \times R_{CS}}{C_1}} \times \left(\frac{V_{ref} \times R_3 \times C_1}{R_4 \times C_2}\right) \quad \text{(Eq. 3)}$$

With reference voltage $V_{ref}$ a fixed number, the only variable input to Equation 3 is the current sense voltage Vcs of the output line. Controller 110 may therefore implement performing a calculation of Equation 3 to determine the average output current Ioutput on the output line through output pin 138.

Equation 3 may also be restated to derive a different form, stated below as Equation 4:

$$\frac{\frac{\int_0^T V_{CS}/R_4 dt}{C_2}}{\frac{\int_0^T \frac{V_{ref}}{R_3} R_{CS}}{C_1}} = \frac{\left(\frac{V_{ref} \times R_3 \times C_1}{R_4}\right)}{I_{output}} \times R_{CS} \quad \text{(Eq. 4)}$$

In some examples, controller 110 may store a determination of the right side of Equation 4, including the reference voltage $V_{ref}$ and resistances of applicable resistors, with a target value of the output current $I_{output}$ as a single number. Controller 110 may then measure the current sense voltage Vcs and the reference voltage over a given AC half-cycle, perform a calculation of the left side of Equation 4 using the results of those measured output voltage Vcs and reference voltage $V_{ref}$ as in the left side of Equation 4, and compare that result with the fixed number of the right side of Equation 4. In these examples, if the result for the left side of Equation 4 is determined to be above the number representing the right side of Equation 4, this indicates the average output current is lower than the target value and should be raised, while if the result for the left side of Equation 4 is determined to be below the number representing the right side of Equation 4, this indicates the average output current is higher than the target value and should be lowered.

In some examples, controller 110 may explicitly determine the output current Ioutput in accordance with a derivation of Equation 4, and then determine whether to modify the output current to be higher or lower, e.g., by modifying the interval switch timing of low side power switch 142 to raise or lower the output current. An example derivation of Equation 4 is expressed in Equation 5:

$$I_{output} = \frac{\frac{\int_0^T V_{ref}/R_3 dt}{C_1}}{\frac{\int_0^T \frac{V_{CS}}{R_4} dt}{C_2}} = \left(\frac{V_{ref} \times R_3}{R_4}\right) \times R_{CS} \quad \text{(Eq. 5)}$$

Controller 110 may perform a single determination of ($V_{ref}*R_3*Rcs/R_4$) and store this number for comparison with the left portion of the right side of Equation 5 based on the ongoing measurements of the reference voltage $V_{ref}$ and output voltage Vcs, in some examples. An example of this is expressed below as Equation 6, with a reference constant $const_{ref}$ that may be set equal to ($V_{ref}*R_3*Rcs/R_4$):

$$I_{output} = \frac{\frac{\int_0^T V_{ref}/R_3 dt}{C_1}}{\frac{\int_0^T \frac{V_{CS}}{R_4} dt}{C_2}} \times const_{ref} \quad \text{(Eq. 6)}$$

Controller 110 may also re-measure the reference voltage and reset the reference constant for purposes of Equation 6 at times, if applicable in a given implementation. Controller 110 may thus perform a calculation of Equation 5 or 6 periodically, such as after one AC half-cycle. (Reference to Equation 5 hereafter may be understood to be applicable analogously to Equation 6 in applicable examples.) If the resulting value for the average output current $I_{output}$ as determined from performing Equation 5 is less than the target value of the average output current, controller 110 may increase the turn-on time $T_{on}$ for low side power switch 142 to raise the output current.

For example, digital divider circuit $B_3$ may perform Equation 5 to determine the average output current $I_{output}$, determine the average output current Ioutput is lower than the target value for the average output current, and signal to $T_{on}$ generator circuit $B_4$ to increase the turn-on time $T_{on}$ for low side power switch 142 for the next AC half-cycle, thereby raising the output current. On the other hand, digital divider circuit $B_3$ may perform Equation 5 to determine the average output current $I_{output}$, determine the average output current $I_{output}$ is higher than the target value for the average output current, and signal to $T_{on}$ generator circuit $B_4$ to decrease the turn-on time $T_{on}$ for low side power switch 142 for the next AC half-cycle, thereby lowering the output current. Controller 110 may iterate this process over one or a small number of AC half-cycles to narrow in on the target value of output current (if any inaccuracy occurred in the first place) and then maintain the output current at a constant value at the target value. Controller 110 may stabilize the output current at the target value within a small fraction of a second in some examples.

In examples using a peak detector, controller 110 may be configured to perform a calculation of average output current analogously to any of Equations 3-6 with $V_{CSpeak}$ substituted for $V_{CS}$ and a factor of 2 added to the denominator, analogous to the comparison between Equations 1 and 2 as described above. In various examples, therefore, controller 110 may perform a calculation of an average output current at the output line, based at least in part on the current sense voltage, and further based on a reference voltage and on capacitances and resistances of internal capacitors and resistors incorporated as part of controller 110 (e.g., as internal elements of controller 110 implemented as a single integrated circuit). In various examples, therefore, controller 110 may perform a calculation of an average output current at the output line without requiring a large external capacitor.

Figure 7:
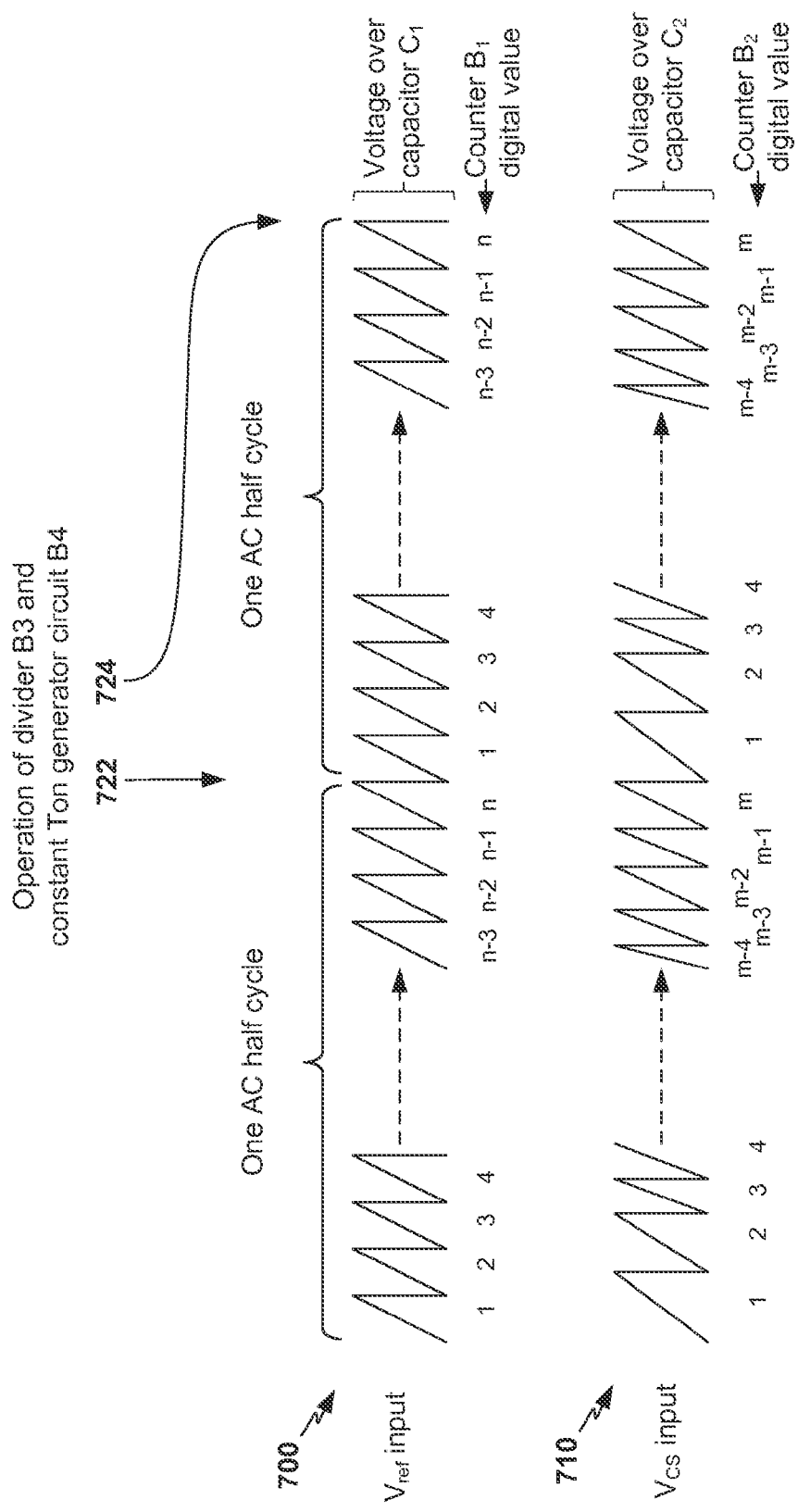
FIG. 7 depicts a reference voltage waveform over a reference capacitor in a reference circuitry group and an output voltage waveform over a capacitor in a current sense circuitry group over two AC half-cycles, in accordance with an example of this disclosure.

FIG. 7 depicts a reference voltage waveform 700 over a reference capacitor $C_1$ in a reference circuitry group 166 and an output voltage waveform 710 over a capacitor $C_2$ in a current sense circuitry group 168 over two AC half-cycles in one example. Divider circuit $B_3$ may perform its calculation of the average output current and signal $T_{on}$ generator circuit $B_4$ accordingly after each interval 722, 724, etc. at the end of each AC half-cycle. FIG. 7 also shows the digital numbers accumulating at reference digital counter $B_1$ and current sense group digital counter $B_2$. As FIG. 7 shows, reference voltage waveform 700 is maintained in a regular sawtooth pattern, while output voltage waveform 710 shows some variation in the time required to reach the peak of each pulse, particularly at the beginning of the two AC half-cycles shown, as divider circuit $B_3$ and $T_{on}$ generator circuit $B_4$ of controller 110 implement their corrective modifications of the average output current. Controller 110 may, after a small number of half-cycles in some examples, modulate the output current to achieve and maintain the output current at the target value.

The operation of controller 110 to perform an internal calculation of the average output current in some examples may thus be summarized as follows. Controller 110 may use external current sense resistor 118 to receive the actual output current shape, which controller 110 may channel via current sense voltage Vcs to current sense circuitry group 168. Controller 110, making use of the voltage from reference voltage $V_{ref2}$, may then generate a current signal based on current sense voltage Vcs. (In some examples, controller 110 may also use a peak detector circuit to sample and hold the peak values of the VCS signal). Controller 110 may then use the resulting current sense signal to charge one internal capacitor $C_2$ with one internal counter $B_2$, within one AC half-cycle. Controller 110 may thus generate a resulting digital number that indicates how many times the internal capacitor $C_2$ is charged by the current sense signal based on the output current during one AC half-cycle. After one AC half-cycle, digital divider circuit $B_3$ may divide the result from counter $B_1$ by the digital number from counter $B_2$. Digital divider circuit $B_3$ may compare the result of the division with a fixed digital number, and determine whether the average output current is lower than or higher than the target value and by how much. Then, $T_{on}$ generator circuit $B_4$ may control the interval timing of internal low side power switch 142 for the next AC half-cycle based at least in part on the calculation of the average output current at the output line at current sense resistor Rcs 118.

Figure 8:
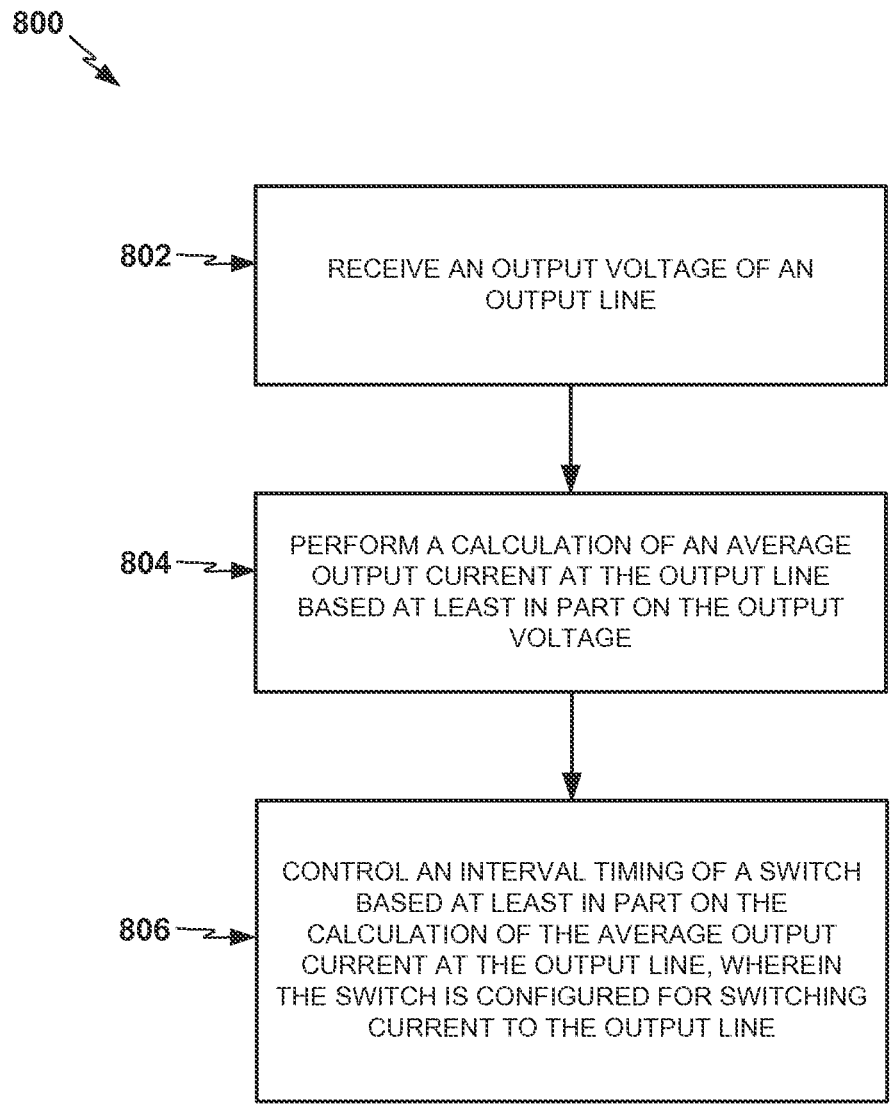
FIG. 8 is a flowchart illustrating a method of operating a driver that internally performs a calculation of the average output current at an output line based at least in part on the output voltage, among other advantages, in accordance with an example of this disclosure.

FIG. 8 is a flowchart illustrating a method 800 of operating a driver that internally performs a calculation of the average output current at an output line based at least in part on the output voltage, among other advantages, in accordance with an example of this disclosure. Method 800 may be a more generalized form of the operation of various drivers without external capacitors of this disclosure.

In the example of FIG. 8, method 800 includes receiving an output voltage of an output line (e.g., output voltage Vcs of the output line through output pin 138 of driver controller 110, as described above with reference to FIGS. 1-7) (802). Method 800 further includes performing a calculation of an average output current at the output line based at least in part on the output voltage (e.g., performing a calculation of the average output current $I_{output}$ delivered by driver controller 110 through output pin 138, such as by digital divider circuit $B_3$ based on the counts performed by digital counter circuits $B_1$ and $B_2$ based on the outputs of reference current circuitry group 166 and current sense circuitry group 168, as described above with reference to FIGS. 1-7 and Equations 1-6) (804). Method 800 further includes controlling an interval timing of a switch $T_{on}$ generator circuit $B_1$ controlling turn-on time $T_{on}$ of internal low side MOSFET transistor power switch $T_0$ 142 based at least in part on the calculation of the average output current $I_{output}$ at the output line through output pin 138, as described above with reference to FIGS. 1-7), wherein the switch (e.g., internal low side MOSFET transistor power switch $T_0$ 142) is configured for switching current to the output line (e.g., through output pin 138 to load 130, as described above with reference to FIGS. 1 and 2) (806).

Any of the circuits, devices, and methods described above may be embodied in or performed in whole or in part by any of various types of integrated circuits, chip sets, and/or other devices, and/or as software executed by a computing device, for example. This may include processes performed by, executed by, or embodied in one or more microcontrollers, central processing units (CPUs), processing cores, field-programmable gate arrays (FPGAs), programmable logic devices (PLDs), virtual devices executed by one or more underlying computing devices, or any other configuration of hardware and/or software.

For example, a driver controller of this disclosure (e.g., driver controller 110 as described above with reference to FIGS. 1-7) may be implemented or embodied as an integrated circuit configured, via any combination of hardware, logic, general purpose processors, application specific integrated circuits (ASICs), field programmable gate arrays (FPGAs), and/or general processing circuits, which may execute software instructions in some examples, to perform various functions described herein. The integrated circuit may be configured to measure and maintain the average output current of driver 100 without requiring a large external capacitor.

Various examples of the invention have been described. These and other examples are within the scope of the following claims.

What is claimed is:

1. A method of controlling a current driver, the method comprising:
   receiving an output voltage of an output line;
   performing a calculation of an average output current at the output line based at least in part on the output voltage; and
   controlling an interval timing of a switch based at least in part on the calculation of the average output current at the output line, wherein the switch is configured for switching current to the output line,
   wherein performing the calculation of the average output current comprises:
   integrating the output voltage over time for a plurality of pulses of the output voltage over an alternating current half-cycle;
   integrating a reference voltage over time for a plurality of pulses over the alternating current half-cycle; and
   comparing results of the integrating the output voltage over time for the plurality of pulses of the output voltage with results of the integrating the reference voltage over time for the plurality of pulses of the reference voltage.

2. The method of claim 1, further comprising:
performing a comparison of the calculated average output current with a target output current value; and
controlling the interval timing of the switch based at least in part on the comparison of the calculated average output current with the target output current value.

3. The method of claim 1, wherein performing the calculation of the average output current further comprises:
counting the pulses of the output voltage over the alternating current half-cycle;
counting the pulses of the reference voltage over the alternating current half-cycle;
performing a division between a number of the pulses of the output voltage and a number of the pulses of the reference voltage over the alternating current half-cycle; and
performing a comparison of a result of the division between the number of the pulses of the output voltage and the number of the pulses of the reference voltage over the alternating current half-cycle with a reference value.

4. The method of claim 1, wherein receiving the output voltage of the output line comprises receiving a current sense voltage across a current sense resistor connected across the output line.

5. A method of controlling a current driver, the method comprising:
receiving an output voltage of an output line;
performing a calculation of an average output current at the output line based at least in art on the output voltage;
controlling an interval timing of a switch based at least in part on the calculation of the average output current at the output line, wherein the switch is configured for switching current to the output line; and
sampling peak values of the output voltage for each of a plurality of pulses of the output voltage over an alternating current (AC) half-cycle,
wherein performing the calculation of the average output current at the output line is based at least in part on a comparison of an integration of the peak values of the output voltage for each of the plurality of pulses of the output voltage over the alternating current half-cycle with an integration based on a reference voltage.

6. A driver controller device comprising:
a current sense circuitry group configured to receive an output voltage of an output line;
a divider circuit configured to perform a calculation of an average output current at the output line based at least in part on the output voltage; and
a turn-on time generator circuit configured to control an interval timing of a switch based at least in part on the calculation of the average output current at the output line, wherein the switch is configured for switching current to the output line,
wherein the divider circuit is further configured to perform the calculation of the average output current by being configured to:
integrate the output voltage over time for a plurality of pulses of the output voltage over an alternating current half-cycle;
integrate a reference voltage over time for a plurality of pulses over the alternating current half-cycle; and
compare results of the integrating the output voltage over time for the plurality of pulses of the output voltage with results of the integrating the reference voltage over time for the plurality of pulses of the reference voltage.

7. The driver controller device of claim 6,
wherein the divider circuit is further configured to perform a comparison of the calculated average output current with a target output current value, and
wherein the turn-on time generator circuit is further configured to control the interval timing of the switch based at least in part on the comparison of the calculated average output current with the target output current value.

8. The driver controller device of claim 6, further comprising:
a reference current circuitry group;
a current sense counter configured to count the pulses of the output voltage via the current sense circuitry group; and
a reference counter configured to count the pulses of the reference voltage via the reference current circuitry group.

9. The driver controller device of claim 8, wherein the divider circuit being configured to perform the calculation of the average output current further comprises:
the divider circuit being configured to count the pulses of the output voltage via the current sense counter over the alternating current half-cycle;
the divider circuit being configured to count the pulses of the reference voltage via the reference counter over the alternating current half-cycle.

10. The driver controller device of claim 9, wherein the divider circuit being configured to perform the calculation of the average output current further comprises:
the divider circuit being configured to perform a division between a number of the pulses of the output voltage and a number of the pulses of the reference voltage over the alternating current half-cycle; and
the divider circuit being configured to perform a comparison of a result of the division between the number of the pulses of the output voltage and the number of the pulses of the reference voltage over the alternating current half-cycle with a reference value.

11. The driver controller device of claim 6,
wherein the current sense circuitry group is further configured to sample peak values of the output voltage for each of a plurality of pulses of the output voltage over an alternating current (AC) half-cycle,
wherein the divider circuit is further configured to perform the calculation of the average output current at the output line based at least in part on a comparison of an integration of the peak values of the output voltage for each of the plurality of pulses of the output voltage over the alternating current half-cycle with an integration based on a reference voltage.

12. The driver controller device of claim 6, wherein the turn-on time generator circuit being configured to receive the output voltage of the output line comprises being configured to receive a current sense voltage across a current sense resistor connected across the output line.

13. An integrated circuit for controlling a driver, the integrated circuit comprising:
a current sense circuitry group configured to receive an output voltage of an output line;

a divider circuit configured to perform a calculation of an average output current at the output line based at least in part on the output voltage; and a turn-on time generator circuit configured to control an interval timing of a switch based at least in part on the calculation of the average output current at the output line, wherein the switch is configured for switching current to the output line, wherein the divider circuit is further configured to perform the calculation of the average output current by being configured to:

integrate the output voltage over time for a plurality of pulses of the output voltage over an alternating current half-cycle;

integrate a reference voltage over time for a plurality of pulses over the alternating current half-cycle; and compare results of the integrating the output voltage over time for the plurality of pulses of the output voltage with results of the integrating the reference voltage over time for the plurality of pulses of the reference voltage.

14. The integrated circuit of claim 13, wherein the divider circuit is further configured to perform a comparison of the calculated average output current with a target output current value, and wherein the turn-on time generator circuit is further configured to control the interval timing of the switch based at least in part on the comparison of the calculated average output current with the target output current value.

15. The integrated circuit of claim 13, further comprising:

a reference current circuitry group;

a current sense counter configured to count the pulses of the output voltage via the current sense circuitry group; and a reference counter configured to count the pulses of the reference voltage via the reference current circuitry group, wherein the divider circuit being configured to perform the calculation of the average output current further comprises the divider circuit being configured to:

count the pulses of the output voltage via the current sense counter over the alternating current half-cycle;

count the pulses of the reference voltage via the reference counter over the alternating current half-cycle;

perform a division between a number of the pulses of the output voltage and a number of the pulses of the reference voltage over the alternating current half-cycle; and perform a comparison of a result of the division between the number of the pulses of the output voltage and the number of the pulses of the reference voltage over the alternating current half-cycle with a reference value.

* * * * *